United States Patent [19]

Evans

[11] 4,447,076
[45] May 8, 1984

[54] CONDUIT ASSEMBLY

[75] Inventor: Orde R. Evans, Lafayette, La.

[73] Assignee: Oreco III, Inc., Lafayette, La.

[21] Appl. No.: 370,626

[22] Filed: Apr. 22, 1982

Related U.S. Application Data

[63] Continuation-in-part of Ser. No. 85,756, Oct. 17, 1979, abandoned.

[51] Int. Cl.³ ............................................. F16L 9/14
[52] U.S. Cl. .................................. 285/55; 285/179; 285/336; 285/363
[58] Field of Search ................... 285/15, 16, 17, 174, 285/179, 55, 416, 336, 363; 138/140, 143

[56] References Cited

U.S. PATENT DOCUMENTS

| | | | |
|---|---|---|---|
| 2,374,763 | 5/1945 | Martin | 285/55 |
| 2,699,344 | 1/1955 | Bissell | 285/336 X |
| 3,142,499 | 7/1964 | Lang | 285/336 X |
| 3,429,588 | 2/1969 | Nelson | 285/55 X |
| 3,551,006 | 12/1970 | James | 285/16 |
| 3,794,359 | 2/1974 | Fiser | 285/55 |
| 4,117,201 | 9/1978 | Keifert | 285/179 X |
| 4,130,300 | 12/1978 | Sheridan | 285/179 X |

FOREIGN PATENT DOCUMENTS

| | | | |
|---|---|---|---|
| 544155 | 9/1959 | Belgium | 285/55 |
| 1240349 | 5/1967 | Fed. Rep. of Germany | 285/55 |
| 1546600 | 11/1966 | France | 285/55 |
| 627990 | 5/1954 | Italy | 285/55 |

Primary Examiner—Dave W. Arola
Attorney, Agent, or Firm—Browning, Bushman, Zamecki & Anderson

[57] ABSTRACT

The invention pertains to conduit assemblies, such as pipeline assemblies. A first conduit section comprises a first tubular conduit body. A second conduit section comprises a second tubular conduit body connected in end-to-end relation with the first conduit body. The bodies have opposed end faces. The second conduit section further comprises a tubular lining disposed within the second conduit body and having an inner diameter substantially equal to the inner diameter of the first conduit section. An annular seal sealingly engages between the opposed end faces of the conduit body, the seal being sufficiently rigid to maintain an axial gap between said end faces. The tubular lining extends beyond the end face of its respective conduit body into said axial gap and abuts the first conduit section at its inner diameter. Such extending portion of the tubular lining is preferably beveled on its outer side to form a lip at its inner diameter for noncompressive abutment with the first conduit section.

24 Claims, 6 Drawing Figures

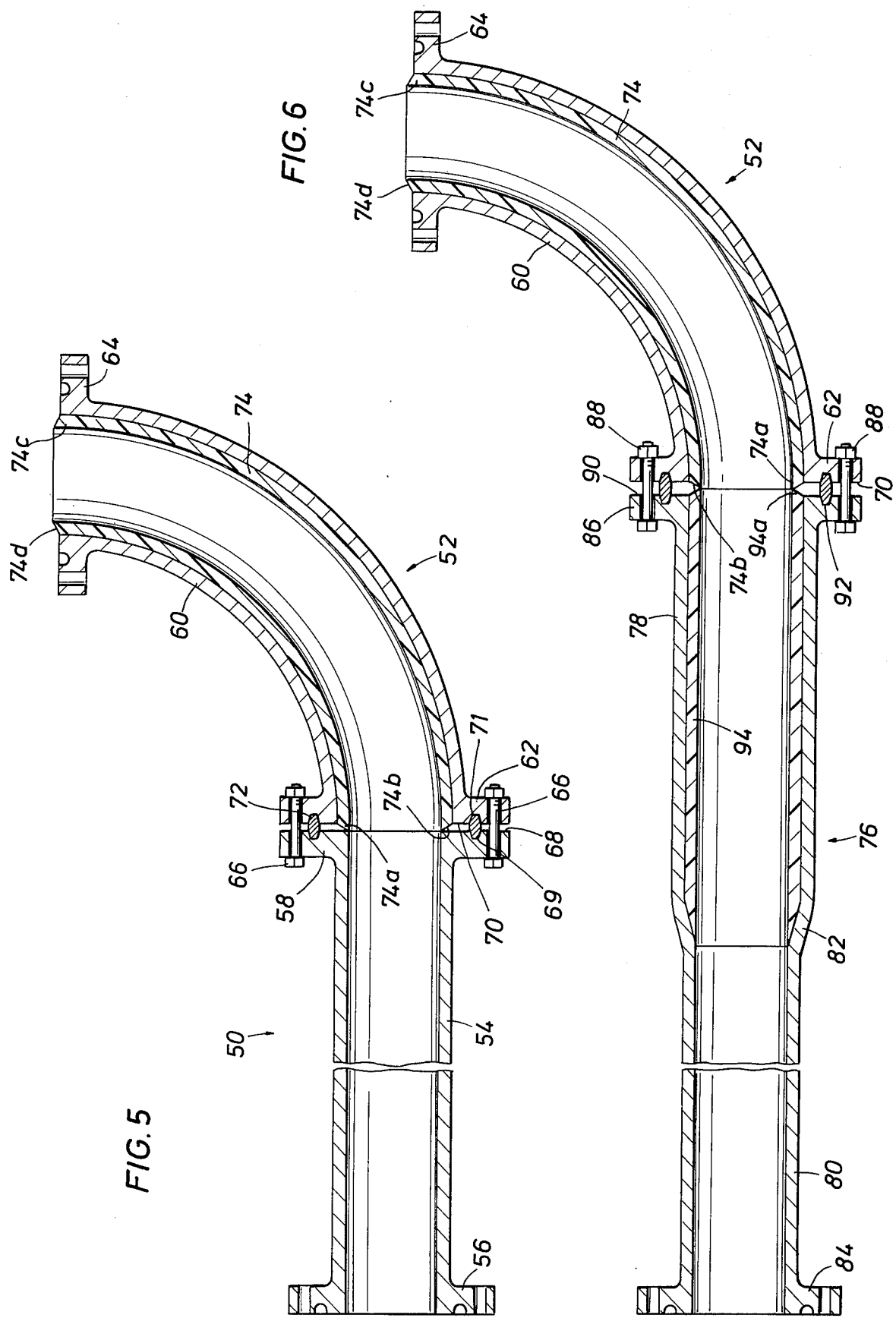

CONDUIT ASSEMBLY

CROSS-REFERENCE TO RELATED APPLICATION

This is a continuation-in-part of copending U.S. Application Ser. No. 085,756 filed Oct. 17, 1979, now abandoned.

BACKGROUND OF THE INVENTION

1. Field of the Invention

The invention pertains to tubular conduit assemblies such as pipelines. While the invention may be applied to pipelines for various different uses, it is particularly well adapted for use in pipelines for conveying crude oil and similar substances having abrasive solids suspended or entrained therein.

2. Description of the Prior Art

The presence of solid particles in hydrocarbon liquids being conveyed by pipelines may cause severe wear problems due to abrasion of the interior of the pipelines. Regardless of the nature of the solids, the abrasion is particularly acute in the elbows or curved portions of the pipelines. Due to the inertia of the flowing material, the particles tend to strike the inner surface of the elbow rather than merely flowing parallel thereto, and the problem may be further compounded by turbulence in the elbows. Similar problems may occur in rectilinear conduit sections as well, e.g. where there is, for any reason, some degree of turbulence.

In the past, straight sections of pipe or other conduits have been lined with substances intended to protect the interior of the pipe sections from chemical or physical deterioration. However, as mentioned above, the straight portions of a pipeline do not typically represent the sites of the most severe physical abrasion problems. Furthermore, such sections represent the major portions of the pipelines as a whole, and coating or lining of such a large extent of pipeline is sometimes too expensive to be justified by the advantages obtained. In any event where pipelines or sections thereof have been coated or lined, the form of the lining and its engagement with the pipe bodies has not been entirely satisfactory for a number of reasons. Furthermore, the types of lining materials previously used have not been appropriate for high pressure environments and, in some instances, have been less than completely satisfactory in preventing wear because of chemical deterioration caused by the hydrocarbon liquids in the stream.

SUMMARY OF THE INVENTION

The present invention provides a tubular conduit assembly comprising first and second conduit sections connected in end-to-end relation. The first conduit section comprises, at least, a first tubular conduit body, while the second section comprises both a second tubular conduit body, connected in end-to-end relation to the first conduit body, and a tubular lining disposed within the second conduit body. The tubular lining has an inner diameter substantially equal to that of the inner diameter of the first conduit section, whether the latter diameter is defined by an unlined first conduit body or by another tubular lining within the first conduit body. The second conduit section may be nonrectilinear and/or may be intended for use in a position in which turbulence would occur and abrasion would be a particular problem. The tubular lining thus not only protects this more vulnerable section against abrasion, but by virtue of the substantial identity of inner diameters of the lining and the next adjacent pipe section, any shoulders on which abrasives might otherwise impinge are eliminated, and turbulence is further minimized.

The first and second conduit bodies have opposed end faces between which an annular seal is sealingly engaged. The seal is sufficiently rigid to maintain an axial gap between the two end faces of the bodies. The tubular lining extends beyond the end face of the second conduit body and into the axial gap to abut the first conduit section adjacent its inner diameter. Thus, there is provided a smooth, uniform-diameter transition or juncture between the two conduit sections, again further minimizing turbulence and irregularities on which abrasives might otherwise impinge.

The relatively rigid seal and the axially extending end of the tubular lining cooperate to produce a number of salient effects. For example, the preferred form of seal, in many pipelines, is a high pressure type metal gasket which necessarily creates or maintains a gap between the opposed end faces which it seals. The tubular lining end, extending into the gap thus created to abut the next adjacent pipe section, provides for a smooth, continuous juncture, despite this gap, and serves as a barrier preventing solids from accumulating within the gap. Thus, the lining extension facilitates the use of the preferred form of seal. Conversely, the seal itself, being relatively rigid and capable of maintaining a desired spacing or gap between adjacent conduit bodies, while permitting them to be rigidly connected together by other means such as bolts, allows for preferred embodiments of the lining extension. More specifically, it permits such extension to abut the next adjacent conduit section without substantial compression or deformation, which might otherwise detract from the generally smooth-walled configuration provided by the present invention.

To further enhance the aforementioned extending end portion of the tubular lining, it may be beveled on its outer side so as to form a lip at its inner diameter. This configuration more readily permits of the smooth-walled configuration and noncompressive abutment mentioned above.

The lining is preferably comprised of a synthetic polymer, preferably flexible, such as polyurethane, an acrylonitrile-butadiene copolymer, a synthetic rubber, etc. suitable for high pressure use, while the conduits themselves are comprised of a conventional metal.

It is therefore a principal object of the present invention to provide an improved conduit assembly.

Another object of the present invention is to provide such an assembly, including first and second conduit bodies, with a relatively rigid seal means therebetween, one of the bodies having a tubular lining extending into the gap created by the seal means to abut the next adjacent pipe section.

Still another object of the present invention is to provide such an assembly in which the portion of the tubular lining so extending is beveled on its outer side to form a lip at its inner diameter.

A further object of the present invention is to provide an improved conduit section.

Still other objects, features, and advantages of the present invention will be made apparent by the following detailed description of the preferred embodiments, the drawings, and the claims.

BRIEF DESCRIPTION OF THE DRAWINGS

FIG. 5 is a longitudinal cross-sectional view of a third embodiment of the invention.

FIG. 6 is a longitudinal cross-sectional view of a fourth embodiment of the invention.

DETAILED DESCRIPTION

Figure 1:
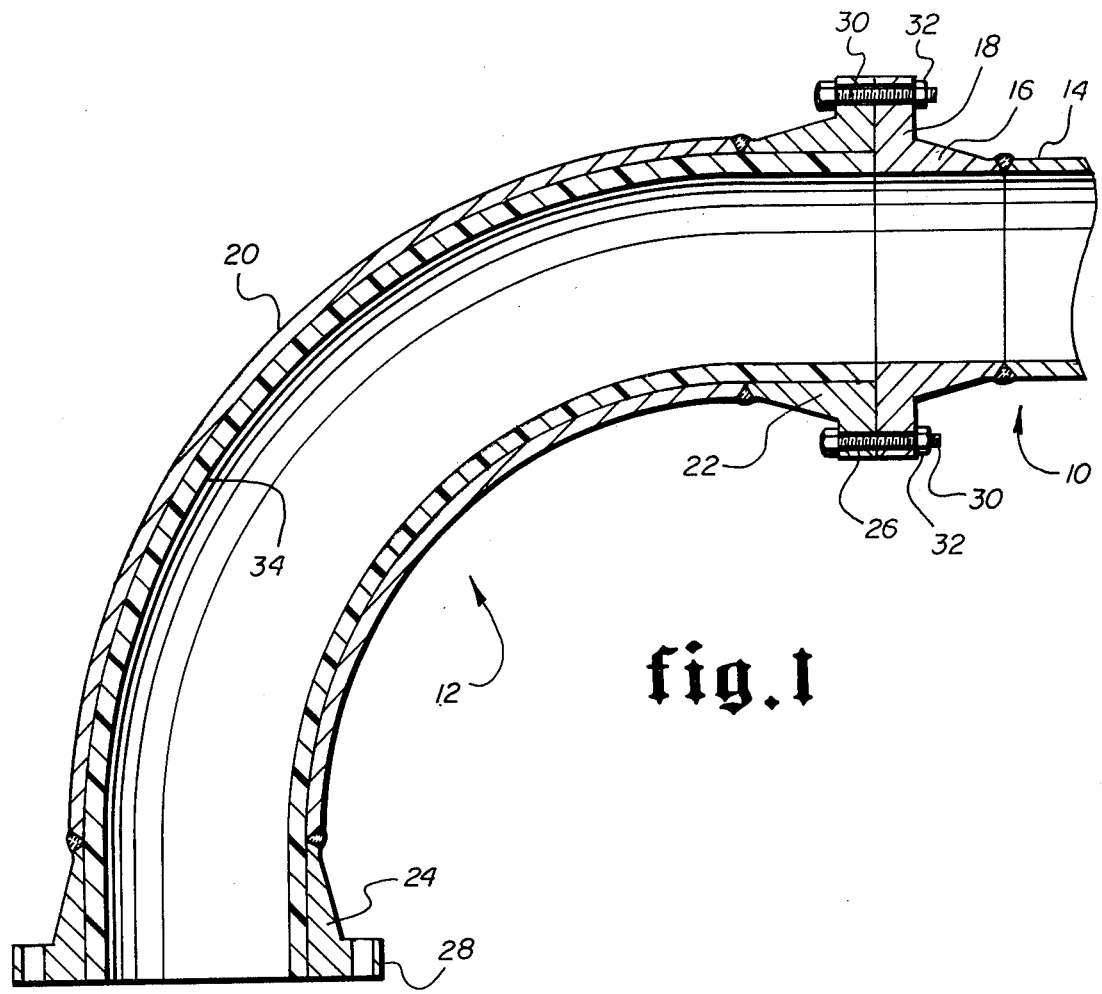
FIG. 1 is a longitudinal cross-sectional view of a first embodiment of the invention.
Figure 2:
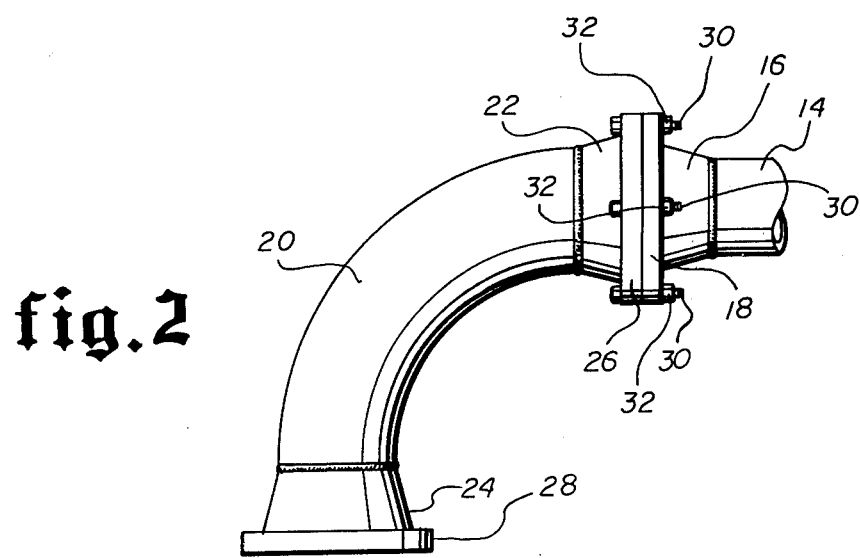
FIG. 2 is an elevational view on a reduced scale of the assembly of FIG. 1.

Referring to FIGS. 1 and 2, there is shown a first embodiment of conduit assembly or pipeline including a first conduit section 10 joined by a flanged connection to a second conduit section 12. The first conduit section 10 comprises a conduit body of a conventional metal and is substantially straight, i.e. has a rectilinear centerline. The conduit body of section 10 could be monolithic or, as shown, may be comprised of a main body section 14 welded or otherwise rigidly affixed to a connection section 16 which defines a radially outwardly extending annular flange 18 by which conduit 10 is connected to conduit 12. The other end of the body of conduit section 10 (not shown) may have an identical but oppositely directed connection section for connecting conduit 10 to another conduit of the assembly.

Conduit section 12 includes a body 20, 22, 24 comprised of a similar metal but has a nonrectilinear, and more specifically a curved, centerline so that it forms an elbow. The body of conduit section 12 is comprised of a main body section 20 defining the curved portion thereof and having substantially uniform inner and outer diameters. As used herein, "substantially uniform" and "substantially equal" will refer to that degree of uniformity of diameters achieved by conventional, commercially accepted pipe-forming techniques. The inner diameter of section 20 is greater than that of conduit 10, and the outer diameter of section 20 is likewise greater than the outer diameter of the major portion of conduit 10 defined by section 14, the wall thickness of sections 20 and 14 being approximately equal. Conduit 12 also comprises a pair of connection sections 22 and 24 welded to respective opposite ends of main body section 20. Sections 22 and 24 have inner diameters substantially equal to that of section 20, but their outer diameters are varied to form respective radially outwardly extending annular flanges 26 and 28 at opposite ends of conduit 12. However, the outer diameters of flanges 26 and 28 are not as large as would ordinarily be provided on a pipe or conduit having the inner and outer diameters of section 20. On the contrary, flanges 26 and 28 have outer diameters substantially equal to that of flange 18. This facilitates proper connection of flanges 26 and 18, as bolts 30 and nuts 32 as shown. Flange 28 can likewise be connected to a third conduit similar to conduit 10.

To facilitate manufacture of sections 22 and 27, having varying outer diameters, their centerlines are preferably straight or rectilinear, the curve of the elbow formed by conduit 12 being defined by the uniform diameter main body section 20.

A tubular lining 34 is disposed within body 20, 22, 24 of conduit section 12 along substantially the entire length thereof. Lining 34 has a substantially uniform outer diameter matching the inner diameter of body 20, 22, 24 as well as a substantially uniform inner diameter substantially equal to that of conduit section 10. Accordingly, when the two conduit sections 10 and 12 are connected as shown, the assembly as a whole has a substantially uniform inner diameter having no shoulders or the like to create or worsen turbulence problems, but nevertheless is provided with a protective surface along the curved portion defined by section 20 of conduit 12, in which wear problems due to abrasion are greatest.

Lining 34 may be comprised of any suitable abrasion resistant material, the material chosen preferably being determined by the type of substances to be conveyed by the conduit assembly or pipeline. For pipelines conveying hydrocarbons, lining 30 is preferably comprised of a flexible synthetic polymer which is inert to hydrocarbons, such as polyurethane, an acrylonitrile-butadiene copolymer, a synthetic rubber, etc. These materials, unlike certain natural rubbers, are resistant not only to abrasion but also to chemical damage by hydrocarbons. Lining 34 is sufficiently flexible to allow insertion into body 20, 22, 24 and may be fixed within body 20, 22, 24 in any suitable manner, e.g. bonding, the preferred manner of fixation against being determined by the precise materials chosen for body 20, 22, 24 and lining 34.

Figure 3:
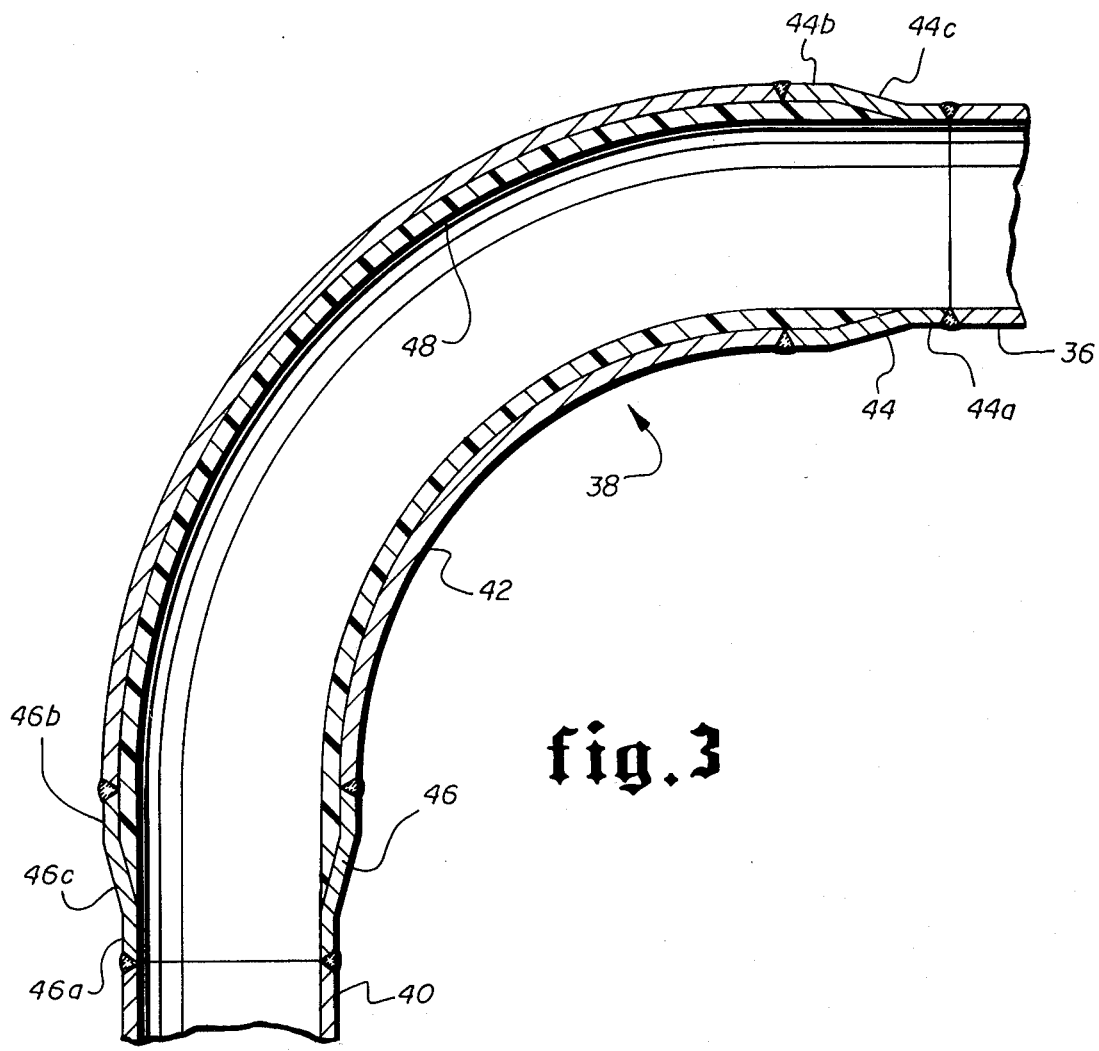
FIG. 3 is a longitudinal cross-sectional view of a second embodiment of the invention.
Figure 4:
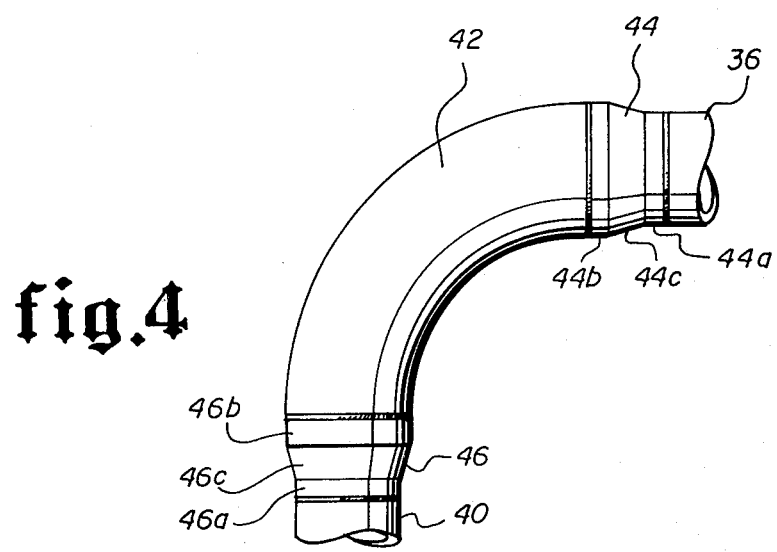
FIG. 4 is an elevational view on a reduced scale of the assembly of FIG. 3.

Turning now to FIGS. 3 and 4, there is shown a second embodiment of the invention. The conduit assembly of FIGS. 3 and 4 includes a first conduit section comprising body 36 having a rectilinear centerline and substantially uniform inner and outer diameters. Body 36 is welded to one end of the body 42, 44, 46 of a second conduit section 38, the other end of which is in turn welded to a third conduit body 40, substantially identical to body 36.

Conduit body 38 has a main body section 42 substantially identical to section 20 of the embodiment of FIGS. 1 and 2. Section 42 has a curved centerline and defines the major part of a central portion of conduit 38 having an inner diameter greater than those of bodies 36 and 40 and an outer diameter greater than the outer diameters of bodies 36 and 40. Like the body of conduit 12 of the first embodiment, the body of conduit 38 likewise includes connection sections 44 and 46 welded to respective opposite ends of main body section 42. However, because bodies 36 and 40 to be connected to body 42, 44, 46 are flange-less, sections 44 and 46 serve as reducers. More specifically, section 44 includes an end portion 44a whose inner and outer diameters are substantially equal to those of body 36 connected thereto. The other end of reducer 44, which is welded to main body section 38, has its inner and outer diameters substantially equal to those of said main body section so as to form a continuation of the central large diameter portion. Intermediate portions 44a and 44b, reducer 44 has a frustoconical portion 44c whose inner and outer diameters taper from those of section 42 to those of body 36. Thus, portion 44c of reducer 44 forms a transition portion of the body 42, 44, 46 as a whole.

Reducer 46 is substantially identical to reducer 44, having a large diameter end portion 46b welded to section 42, a small diameter end portion 46a welded to body 40, and an intermediate transition portion 46c, whose inner and outer diameters vary from those of portion 46b to those of portion 46a. Reducers 44 and 46, having varying inner and outer diameters, may be more conveniently manufactured separately from main body section 42, and with rectilinear centerlines, for subsequent welding to section 42, the latter defining the entirety of the curved portion of the body of conduit section 38.

A tubular lining 48 is fixed within body 42, 44, 46. Lining 48 may be formed of any suitable abrasion resistant material, as described more fully above in connection with the first embodiment, and may be affixed within body 42, 44, 46 in any suitable manner, depending upon the materials chosen for the lining and conduit respectively. Lining 48 has a substantially uniform inner diameter substantially equal to that of bodies 36 and 40. Lining 48 extends along the large diameter portion defined by section 42 and portions 44b and 46b of the reducers, as well along transition portions 44c and 46c, terminating adjacent small diameter end portions 44a and 46a. The outer diameter of lining 48 is suitably graduated along transition portions 44c and 46c so as to match the inner diameters thereof. Accordingly, the conduit assembly as a whole provides a substantially uniform inner diameter while still providing abrasion and wear protection along the entirety of the curved portion of the assembly.

Referring now to FIG. 5, there is shown an assembly including first and second conduit sections 50 and 52 respectively. Conduit section 50 comprises an unlined rigid conduit body 54, formed of a suitable metal or the like and having a straight rectilinear longitudinal centerline. Flanges 56 and 58 are formed at opposite ends of body 54. Flange 56, at the end of body 54 distal conduit section 52, is a standard sized flange for pipe of the inner and outer diameters of body 54. Flange 58, on the other hand, is oversized for connection to the conduit body 60 of section 52. Body 60 has a curved or nonrectilinear centerline, and more specifically, is a 90° elbow. Although body 60 can, as shown, be integrally formed, it could be comprised of a main body section with connection sections rigidly secured on either end, as in the preceding embodiments. In any event, body 60 has larger inner and outer diameters than body 54. The flanges 64 and 62 formed at the ends of body 60 are standard size for the diameters of that body. Thus, flange 58 of body 54 is, as aforementioned, oversized to match with flange 62 of body 60. Flanges 58 and 62 are connected together by nut and bolt assemblies 66.

It can be seen that the connected ends of bodies 54 and 60 have opposed end faces 68 and 70 respectively, defined partially by the flanges 58 and 62. The faces 68 and 70 have respective opposed annular recesses 69 and 71 extending axially thereinto, and engaged in these recesses is an annular seal in the form of a high pressure type metal gasket 72. The longitudinal extent of gasket 72 is greater than the combined depth of the recesses in which it is engaged, and the gasket is of sufficient rigidity to maintain an axial gap between faces 68 and 70 even while the flanges 58 and 62 are firmly connected together by assemblies 66 with sufficient tightness to seal against gasket 72.

In addition to body 60, conduit section 52 includes a tubular lining 74 within body 60. The inner diameter of lining 74 is equal to that of section 50, i.e. to that of unlined body 54, to form a uniform inner diameter assembly for reasons described hereinabove. The end 74a of lining 74 adjacent the next conduit section 50 extends axially beyond the end face 70 of its own conduit body 60, across the gap defined between faces 68 and 70, to abut body 54 at its inner diameter. Thus, while gasket 72 provides the primary seal between the two conduit sections, the extending portion 74a of lining 74 forms a secondary barrier for preventing materials being carried by the pipeline from entering the gap between faces 68 and 70, and furthermore, provides for a smooth continuous juncture of the inner walls of the two conduit sections.

For a number of reasons, for example in order to prevent bulges or other irregularities in the inner diameter of the overall assembly, it is preferable that the extending portion 74a of lining 74 abut the adjacent conduit section 50, but without substantial compression or deformation. To further facilitate such noncompressive abutment, or putting it another way, to further guard against deformation, extending portion 74a is beveled on its outer side, as shown at 74b, to form a lip at the inner diameter of the end of the lining. The opposite end of lining 74 is similarly axially extended and beveled, as indicated at 74c and 74d, to allow for like abutment with a third conduit section to be connected to the opposite end of body 60. As used herein "beveled" will mean a graduated reduction in diameter, whether it produces a straight profile as shown or a radiused profile.

Referring finally to FIG. 6, there is shown another assembly in which the conduit section 52 of FIG. 5 is shown assembled with a different form of rectilinear conduit section, generally indicated at 76. Since the conduit sections 52 of FIGS. 5 and 6 are identical, their like parts have been given like reference numerals, and will not be again described in detail in connection with FIG. 6. Section 76 comprises a rigid, rectilinear conduit body having a large diameter portion 78 adjacent conduit section 52, a small diameter portion 80 distal conduit section 52, and a transition portion 82 graduated from the inner and outer diameters of portion 78 to the inner and outer diameters of portion 80. Small diameter portion 80 has a flange 84 formed on the end thereof, the flange being a standard size for the diameters of portion 80. Large diameter portion 78 has a flange 86 formed at its end, flange 86 being a standard size for the inner and outer diameters of portion 78. Since the inner and outer diameters of portion 78 are equal to the inner and outer diameters respectively of body 60, flange 86 is similar in size, and more specifically a mirror image, of flange 62. Flanges 62 and 86 are connected together by nut and bolt assemblies 88.

Adjacent section 50, body 76 has an end face 90, partially defined by flange 86, which opposes face 70 of body 60. Faces 70 and 90 have respective opposed annular recesses extending axially thereinto to sealingly engage opposite ends of a metal gasket 92. Gasket 92 is of sufficient size and rigidity to maintain an axial gap between faces 70 and 90 when flanges 86 and 62 are firmly connected together to seal against gasket 92. The adjacent extension 74a of lining 74 extends only halfway across the gap thus created, the remainer of the gap being filled by a similar extension 94a of a lining 94 extending along the large diameter portion 78 and transition portion 82 of the rigid conduit body of conduit section 76. Seal 92 and extensions 74a and 94a are sized so that the latter abut each other at their inner diameters, but without substantial deformation or compression, and thereby form a smooth uniform diameter juncture between the two conduit sections, while also providing a barrier to the axial gap between faces 70 and 90. As shown, the inner diameters of linings 74 and 94 are equal to the inner diameter of the small diameter portion 80 of the lower conduit body. Also, the end of lining 94 within transition portion 82 of that body has its outer diameter tapered to match the inner diameter of portion 82.

While the foregoing examples represent preferred embodiments of the invention, further modifications may be made within the scope of the invention.

I claim:

1. A conduit assembly comprising:
    a first conduit section having inner and outer diameters and comprising a first tubular conduit body;
    a second conduit section comprising a second tubular conduit body disposed in end-to-end relation with said first conduit body, said conduit bodies having opposed end faces, and a tubular lining disposed within said second conduit body and having an inner diameter substantially equal to the inner diameter of said first conduit section;
    annular seal means disposed between said opposed end faces of said conduit bodies, said seal means creating an axial gap between said end faces;
    means connecting said conduit bodies in said end-to-end relation with said seal means therebetween and urging said conduit bodies against said seal means with sufficient force to maintain a substantially high pressure seal between said end faces at said seal means;
    wherein said tubular lining has a portion extending beyond said end face of said second conduit body across said axial gap and substantially non-compressively abutting said first conduit section;
    said seal means being sufficiently rigid to maintain said gap under said force of said connecting means and sized so as to prevent substantial compression of said portion of said tubular lining extending across said gap.

2. The assembly of claim 1 wherein said seal means comprises a high pressure type metal gasket.

3. The assembly of claim 2 wherein said seal means is engaged in opposed annular recesses extending axially into respective ones of said end faces of said conduit bodies.

4. The assembly of claim 3 wherein said conduit bodies include respective annular flanges extending radially outwardly at said end faces, said connecting means comprising bolt means.

5. The assembly of claim 1 wherein the portion of said tubular lining so extending beyond said end face of said second conduit body is beveled on its outer side to form a lip at its inner diameter, said lip so abutting said first conduit section.

6. The assembly of claim 1 wherein said second conduit body and said tubular lining have corresponding substantially nonrectilinear centerlines.

7. The assembly of claim 1 wherein said first conduit body has an inner diameter substantially equal to the inner diameter of said tubular lining.

8. The assembly of claim 7 wherein the portion of said tubular lining so extending beyond said end face of said second conduit body is beveled on its outer side to form a lip at its inner diameter, said lip so abutting said first conduit body adjacent its inner diameter.

9. The assembly of claim 1 wherein said first conduit section further comprises a tubular lining disposed within said first conduit body and having an inner diameter substantially equal to the inner diameter of the tubular lining of said second conduit section, said tubular linings substantially non-compressively abutting at their inner diameters.

10. The assembly of claim 9 wherein said tubular lining of said first conduit section has a portion extending beyond the respective end face of said first conduit body into said axial gap, and wherein the extending portions of said tubular linings are each beveled on their outer sides to form respective lips at the inner diameters of each of said tubular linings.

11. The assembly of claim 10 wherein said seal means and said extending portions of said tubular linings are relatively sized so that said lips of said extending portions of said tubular linings abut each other without substantial compression or deformation.

12. The assembly of claim 9 wherein said first conduit body has a large diameter portion, adjacent said second conduit section, with an inner diameter greater than those of said tubular linings, a small diameter portion, distal said second conduit section, having an inner diameter substantially equal to those of said tubular linings, and a transition portion, intermediate said large and small diameter portions, and having a graduated inner diameter; said tubular lining of said first conduit section extending along said large diameter and transition portions of said first conduit body, and having an outer diameter graduated along said transition portion.

13. The assembly of claim 1 wherein said tubular lining is comprised of an abrasion resistant material.

14. The assembly of claim 13 wherein said lining is comprised of a synthetic polymer.

15. The assembly of claim 14 wherein said conduit bodies are comprised of metal.

16. The assembly of claim 1 wherein said second conduit body comprises a main body member of substantially uniform inner diameter, and a pair of connection members rigidly affixed to respective opposite ends of said main body member, said connection sections having varying diameters.

17. The assembly of claim 1 wherein said first conduit section has a substantially rectilinear centerline.

18. A conduit assembly comprising:
    a first conduit section having inner and outer diameters and comprising a first tubular conduit body;
    a second conduit section comprising a second tubular conduit body disposed in end-to-end relation with said first conduit body, and a tubular lining disposed within said second conduit body and having an inner diameter substantially equal to the inner diameter of said first conduit section, said lining having an end portion beveled on its outer side to form a lip at its inner diameter, said lip substantially non-compressively abutting said first conduit section adjacent its inner diameter;
    annular seal means disposed between said conduit sections and creating an axial gap between said conduit sections, said lip bridging said gap;
    means connecting said conduit bodies in said end-to-end relation with said seal means therebetween and urging said conduit bodies against said seal means with sufficient force to maintain a substantially high pressure seal between said end faces at said seal means;
    said seal means being sufficiently rigid to maintain said gap under said force of said connecting means and sized so as to prevent substantial compression of said lip of said tubular lining.

19. The assembly of claim 18 wherein said second conduit body and said tubular lining have corresponding substantially nonrectilinear centerlines.

20. The assembly of claim 19 wherein said first conduit body has an inner diameter substantially equal to the inner diameter of said tubular lining.

21. The assembly of claim 19 wherein said first conduit section further comprises a tubular lining disposed within said first conduit body and having an inner diameter substantially equal to the inner diameter of the tubular lining of said second conduit section, and further having an end portion beveled on its outer side to form a lip at its inner diameter, said lips of said two tubular linings substantially non-compressively abutting each other.

22. A conduit assembly comprising:
- a first conduit section having inner and outer diameters comprising a first tubular conduit body;
- a second conduit section comprising a second tubular conduit body disposed in end-to-end relation with said first conduit body, said conduit bodies having opposed end faces, and a tubular lining disposed within said second conduit body and having an inner diameter substantially equal to the inner diameter of said first conduit section;
- a high pressure type metal gasket annular seal means disposed between said opposed end faces of said conduit bodies and creating an axial gap between said end faces;
- means connecting said conduit bodies in said end-to-end relation with said seal means therebetween and urging said conduit bodies against said seal means with sufficient force to maintain a substantially high pressure seal between said end faces at said seal means;
- wherein said tubular lining has a portion extending beyond said end face of said second conduit body across said axial gap and substantially non-compressively abutting said first conduit section;
- said seal means being sufficiently rigid to maintain said gap under said force of said connecting means and sized so as to prevent substantial compression of said portion of said tubular lining extending across said gap.

23. The assembly of claim 22 wherein said seal means is engaged in opposed annular recesses extending axially into respective ones of said end faces of said conduit bodies.

24. The assembly of claim 23 wherein said conduit bodies include respective annular flanges extending radially outwardly at said end faces, said connecting means comprising bolt means.

* * * * *